United States Patent
Cho et al.

(10) Patent No.: US 8,347,079 B2
(45) Date of Patent: Jan. 1, 2013

(54) METHOD AND APPARATUS FOR MANAGING AUTHENTICATION INFORMATION IN HOME NETWORK

(75) Inventors: Seong-ho Cho, Seoul (KR); Hyoung-shick Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 940 days.

(21) Appl. No.: 12/339,741

(22) Filed: Dec. 19, 2008

(65) Prior Publication Data

US 2009/0228705 A1 Sep. 10, 2009

Related U.S. Application Data

(60) Provisional application No. 61/033,485, filed on Mar. 4, 2008.

(30) Foreign Application Priority Data

Jul. 21, 2008 (KR) .................. 10-2008-0070788

(51) Int. Cl.
H04L 29/06 (2006.01)
(52) U.S. Cl. .......... 713/156; 713/155; 713/171; 380/44; 726/12
(58) Field of Classification Search .......... 713/155, 713/156, 171; 380/44; 726/12
See application file for complete search history.

(56) References Cited

U.S. PATENT DOCUMENTS

| | | | |
|---|---|---|---|
| 2004/0128509 A1* | 7/2004 | Gehrmann | 713/171 |
| 2005/0188193 A1* | 8/2005 | Kuehnel et al. | 713/155 |
| 2006/0137005 A1 | 6/2006 | Park | |
| 2006/0174105 A1 | 8/2006 | Park | |
| 2008/0155250 A1* | 6/2008 | Tanizawa et al. | 713/152 |
| 2009/0165099 A1* | 6/2009 | Eldar et al. | 726/5 |
| 2009/0222867 A1* | 9/2009 | Munetsugu | 725/100 |

FOREIGN PATENT DOCUMENTS

| | | |
|---|---|---|
| CN | 1790987 A | 6/2006 |
| JP | 2007074390 A | 3/2007 |
| KR | 1020070062199 A | 6/2007 |
| WO | 2007057758 A2 | 5/2007 |

OTHER PUBLICATIONS

Lee et al., "HHome Device Authentication Method based on PKI", Future Generation Communication and Networking (FGCN 2007), Dec. 2007, pp. 7-11.*
Communication, dated Sep. 12, 2012, issued by the European Patent Office in corresponding European Application No. 09716567.4.

(Continued)

*Primary Examiner* — Jeffrey Pwu
*Assistant Examiner* — Hee Song
(74) *Attorney, Agent, or Firm* — Sughrue Mion, PLLC

(57) ABSTRACT

Provided is a method and apparatus for managing authentication information in a home network, the method includes the operation of receiving Product Identification Number (PIN) information that is externally input and is an identifier allocated to a control device or a controlled device at the time of manufacture; and transmitting authentication information to the control device or the controlled device via a Secure Authenticated Channel (SAC) generated by using a Transport Layer Security Pre-Shared Key ciphersuites (TLS-PSK) protocol implemented by using the PIN information, wherein the authentication information is necessary for a user to control the controlled device via the control device.

21 Claims, 7 Drawing Sheets

OTHER PUBLICATIONS

Communication, dated Oct. 10, 2012, issued by the State Intellectual Property Office of P.R. China in corresponding Chinese Application No. 200980116091.2.

Lee, Yun-Kyung et al., "Home Network Device Authentication: Device Authentication Framework and Device Certificate Profile," Jun. 16, 2007, Advances in Web and Network Technologies, and Information Management, pp. 573-582.

Knouse, Charles, "SAML Implementation Guidelines," Working Draft-1, Oasis, Aug. 27, 2004, 40 pages total.

Nakakita, H., et al., "A Study on Secure Wireless Netowrks Consisting of Home Appliances," IEEE Transactions on Consumer Electronics, vol. 49, No. 2, May 2003, pp. 375-381.

Forsberg, Dan, "Use Cases of Implicit Authentication and Key Establishment with Sender and Receiver ID Binding," World of Wireless, Mobile and Multimedia Networks, IEEE International Symposium, Jun. 2007, 8 pages total.

\* cited by examiner

Session ID: RANDOMLY SELECTED 32 BYTES
Nonce R1/R2: 32 BYTES

METHOD AND APPARATUS FOR MANAGING AUTHENTICATION INFORMATION IN HOME NETWORK

CROSS-REFERENCE TO RELATED PATENT APPLICATION

This application claims the benefit of U.S. Provisional Patent Application No, 61/033,485, filed on Mar. 4, 2008, in the U.S. Patent and Trademark Office, and the benefit of Korean Patent Application No. 10-2008-0070788, filed on Jul. 21, 2008, in the Korean Intellectual Property Office, the disclosures of which are incorporated herein their entirety by reference.

BACKGROUND OF THE INVENTION

1. Field of the Invention

Methods and apparatuses consistent with the present invention relate to providing secure communication between devices in a home network, and more particularly, to managing authentication information in a home network, which functions to provide secure communication between a control device and a controlled device.

2. Description of the Related Art

Due to the development of home networks, an existing personal computer (PC)-centered network environment in the home has expanded into a network environment which includes electronic devices using various lower network technologies. In this regard, there was a necessity to develop a technology that can network the electronic devices with a unified system by using Internet Protocol (IP) protocol, thus, a home network middleware technology such as Universal Plug and Play (UPnP) technology has been presented.

The UPnP technology is based on a distributed and open networking architecture, and allows peer-to-peer networking of each electronic device in a home network, without central administration.

In general, in home network middleware, a controlled device such as a UPnP device can model its service into actions and state variables, and a control device such as a UPnP Control Point (CP) can automatically discover the controlled device and then use the service.

In order to configure a home network, a security system must be built to prevent a device from being manipulated by an external intruder. The UPnP technology provides an UPnP security console standard and an UPnP device security standard so as to present a security function between a CP and the device. The standards provide security functions such as discrimination of an UPnP control message, integrity, and authentication.

Wi-Fi Protected Setup (WPS) is a standard for easy and secure establishment of a wireless home network, and is presented by the Wi-Fi Alliance. The goal of the WPS is to simplify the process of connecting a home device to a wireless network, and to protect a home network from an external attack. A mandatory model among WPS models is a Product Identification Number (PIN) method which arranges the input of a serial number of a new device to Registrar of a network so as to start a security session, wherein the serial number is allocated to the new device at the time of manufacture. The security session is composed of eight Extensible Authentication Protocol (EAP) messages.

Also, Transport Layer Security (TLS) is the Internet Engineering Task Force (IETF) standard aiming to provide end-to-end security on a transport layer. End-to-end authentication is provided by a public key algorithm and an X.509 public key certificate. End-to-end confidentiality is provided by a secret key (a session key) shared by using the Handshake Protocol. Also, end-to-end integrity is provided by a message authentication code (MAC).

SUMMARY OF THE INVENTION

The present invention provides a method of managing authentication information in a home network and a security manager apparatus for the method which provides a secure communication between each of devices in the home network.

According to an aspect of the present invention, there is provided a method of managing authentication information in a home network, the method including texternally receiving PIN information that is an identifier allocated to a control device or a controlled device at the time of manufacture; and transmitting authentication information to the control device or the controlled device via an SAC generated by using a Transport Layer Security Pre-Shared Key ciphersuites (TLS-PSK) protocol implemented by using the PIN information, wherein the authentication information is necessary for a user to control the controlled device via the control device.

The method may further include establishing the SAC by using a TLS-PSK protocol implemented by using a TLS session resumption protocol which uses a randomly generated value as a session identification (ID).

The establishing the SAC may include the operations of calculating a hash value by using a Pre-master secretly generated from the PIN information; and transmitting the hash value to the control device or the controlled device, whereby the control device or the controlled device authenticates a security manager.

The authentication information may include a certificate about the control device or the controlled device, a security key shared in the home network, and user authentication information about a user.

The method may further include the operations of generating the certificate about the control device or the controlled device; and receiving the user authentication information from the control device via the SAC.

The method may further include the operations of adding the certificate to a Certificate Revocation List (CRL), wherein the certificate is about a device corresponding to an identifier that is externally input or a device that is not discovered during a predetermined period of time; and distributing the CRL to a plurality of registered control devices and controlled devices.

The method may further include the operations of changing or deleting user authentication information that is externally input; and distributing the changed or deleted user authentication information to the plurality of registered control devices and controlled devices.

The operation of distributing the CRL may include the operation of generating an MAC value by using the security key shared in the home network, thereby transmitting the MAC value along with a message via broadcast/multicast transmission.

The method may be performed by a security manager, and the security manager may be selected from among a plurality of security managers according to a predetermined priority order.

The method may further include requesting update of information to a sub-security manager, which manages authentication information in a lower layer of management, via a control device when authentication information is newly added, changed or deleted; establishing an SAC with the sub-security manager; and transmitting the newly added, changed or deleted authentication information to the sub-security manager.

According to another aspect of the present invention, there is provided a computer readable recording medium having recorded thereon a program for executing the method.

According to another aspect of the present invention, there is provided an apparatus that is a security manager which manages authentication information in a home network, the device including a user interface unit externally receiving PIN information regarding a PIN that is an identifier allocated to a control device or a controlled device at the time of manufacture; and a authentication information transmitting unit which transmits authentication information to the control device or the controlled device via an SAC generated by using a TLS-PSK protocol implemented by using the PIN information, wherein the authentication information is necessary for a user to control the controlled device via the control device.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
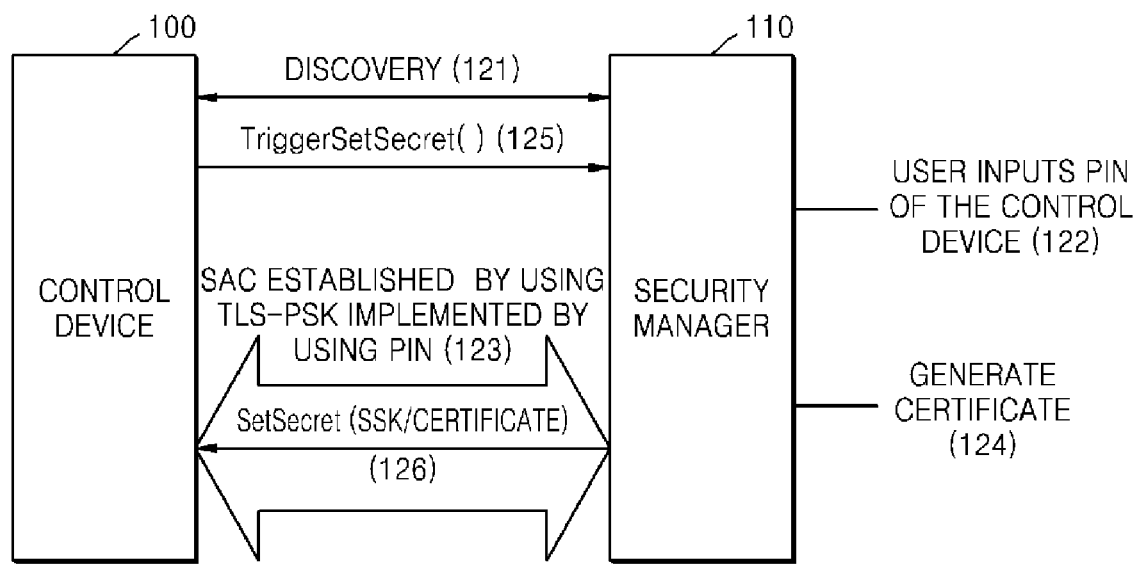
FIG. 1 is a diagram illustrating a method of registering a control device to a security manager according to an exemplary embodiment of the present invention.

The present invention will now be described more fully with reference to the accompanying drawings, in which exemplary embodiments of the invention are shown. Like reference numerals in the drawings denote like elements, and in the drawings, the sizes of the elements may be exaggerated for clarity.

FIG. 1 is a diagram illustrating a method of registering a control device 100 to a security manager 110 according to an exemplary embodiment of the present invention.

In the current exemplary embodiment, the control device 100 may be a CP and a controlled device may be a UPnP device in a UPnP home network. In order to implement the present invention, new actions and new state variables may be defined in the UPnP device.

The security manager 110 manages authentication information for each of devices and users in a home network, and functions to transmit authentication information to the control device 100 or the controlled device via a Secure Authenticated Channel (SAC).

The control device 100, which is not yet registered, discovers the security manager 110 (operation 121). In the case where a plurality of security managers exist, the control device 100 selects a security manager according to a priority order. For the priority order, information about tree hierarchy between each of the security managers, a priority order included in a discovered security manager, or the like may be used.

PIN Information of the control device 100 is externally input to the security manager 110 (operation 122). The control device 100 and the security manager 110 establishes an SAC by using a TLS-PSK protocol implemented by using the PIN shared between the control device 100 and the security manager 110 (operation 123). At this time, the PIN may extend to have a length sufficient to meet a requirement of TLS-PSK by using a random number generator.

Here, the PIN indicates an identifier allocated to the control device 100 at the time of manufacture. Such a PIN may be internally or externally recorded in the control device 100, or may be separately provided to a user purchasing the control device 100.

TLS (Transport Layer Security) is a protocol used in Internet communication security. The TLS-PSK protocol is designed to implement TLS by using a pre-shared symmetric key, instead of using a public key certificate, and to avoid a complicated calculation necessary for an authentication process using a public key. The SAC may be established between the control device and the controlled device by using the TLS-PSK protocol. The TLS and the TLS-PSK protocols are respectively defined in Request for Comments (RFC) 4346 and RFC 4279, and thus, detailed descriptions thereof will be omitted here.

The security manager 110 generates a certificate of the control device 100 (operation 124). The certificate of the control device 100 includes the identifier of the control device 100. The identifier of the control device 100 may be a value obtained by applying a one-way hash function to the PIN of the control device 100. The control device 100 receives authentication information from the security manager 110 via an TriggerSetSecret interface call of the security manager 110 (operation 125), wherein the authentication information includes a Shared Secret Key (SSK) that is a security key shared in a home network, the certificate of the control device 100, and the like. At this time, the authentication information is securely transmitted by using a TLS-PSK based out-of-band protocol (operation 126). For example, the TLS-PSK based out-of-band protocol may be a Hypertext Transfer Protocol (HTTP) protocol. The security manager 110 stores the identifier and the authentication information of the control device 100 that is newly added.

According to the current exemplary embodiment, if PINs corresponding to the number of control devices are input to the security manager 110, the control devices may be efficiently registered in the security manager 110.

Figure 2:
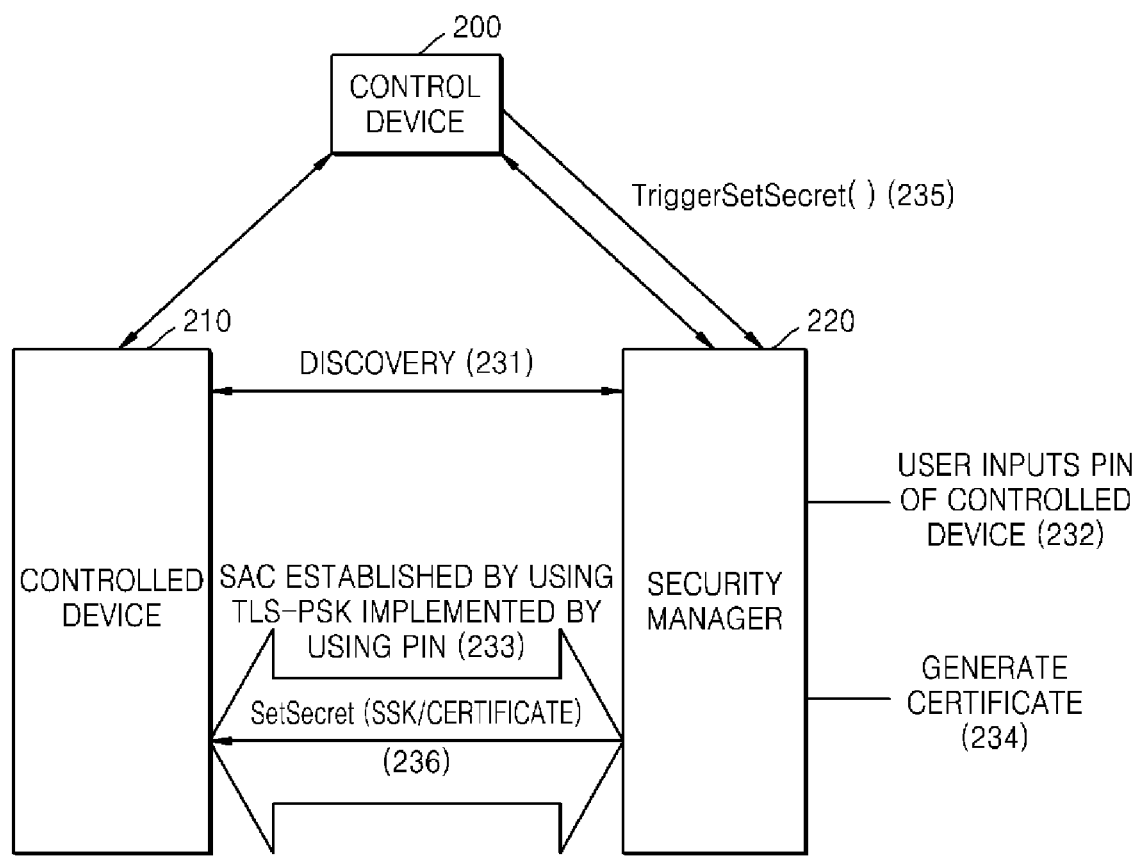
FIG. 2 is a diagram illustrating a method of registering a controlled device to a security manager via a control device according to an exemplary embodiment of the present invention.

FIG. 2 is a diagram illustrating a method of registering a controlled device 210 to a security manager 220 via a control device 200 according to an exemplary embodiment of the present invention.

The control device 200 discovers the security manager 220 and the controlled device 210 that is not yet registered (operation 231).

PIN Information of the control device 200 is externally input to the security manager 220 (operation 232). The controlled device 210 and the security manager 220 establishes an SAC by using a TLS-PSK protocol implemented by using a PIN shared between the controlled device 210 and the security manager 220 (operation 233). The security manager 220 generates a certificate of the controlled device 210 (operation 234). The certificate of the controlled device 210 includes an identifier of the controlled device 210. The identifier of the controlled device 210 may be a value obtained by applying a one-way hash function to a PIN of the controlled device 210. The control device 200 may call a TriggerSetSecret( ) interface of the security manager 220 (operation 235), thereby enabling the security manager 220 to deliver the generated certificate of the controlled device 210 to the corresponding controlled device 210. At this time, authentication information including an SSK, the certificate, and the like is securely transmitted by using a TLS-PSK based out-of-band protocol (operation 236). For example, the TLS-PSK based out-of-band protocol may be an HTTP protocol. The security manager 220 stores the identifier and the authentication information of the controlled device 210 that is newly added.

According to the current exemplary embodiment, if PINs corresponding to the number of controlled devices are input to the security manager 220, the controlled devices may be efficiently registered in the security manager 220.

In the case where the control device 200 or the controlled device 210 is removed from a home network, the certificate of the control device 200 or the controlled device 210 to be removed should be invalidated. In this regard, since the SSK is used only for determining integrity of a message, it is not particularly necessary to update the SSK.

The security manager 220 may receive an identifier of a device to be removed from a user via a user interface (UT) of the control device 200 or an UT of the controlled device 210, and may remove the device from a device list. Otherwise, a device, which has not been discovered during a predetermined period of time, may be removed from the device list that is managed by the security manager 220.

The security manager 220 adds certificate information about a certificate of the removed device to a CRL. The security manager 220 distributes the CRL to registered devices. Here, the security manager 220 generates a MAC value by using the SSK, and transmits the MAC value along with the CRL via broadcast/multicast transmission. By doing so, integrity of the CRL may be ensured.

According to the current exemplary embodiment, it is possible to efficiently revoke a certificate of a device. That is, when the CRL is distributed, it is not necessary to set a secure channel for each of the registered devices and to transmit the CRL to each of the registered devices via unicast transmission but it is possible to transmit the CRL to each of the registered devices via single broadcast/multicast transmission. At this time, by using the SSK in calculation of the MAC value, the integrity of the CRL may be ensured.

Figure 3:
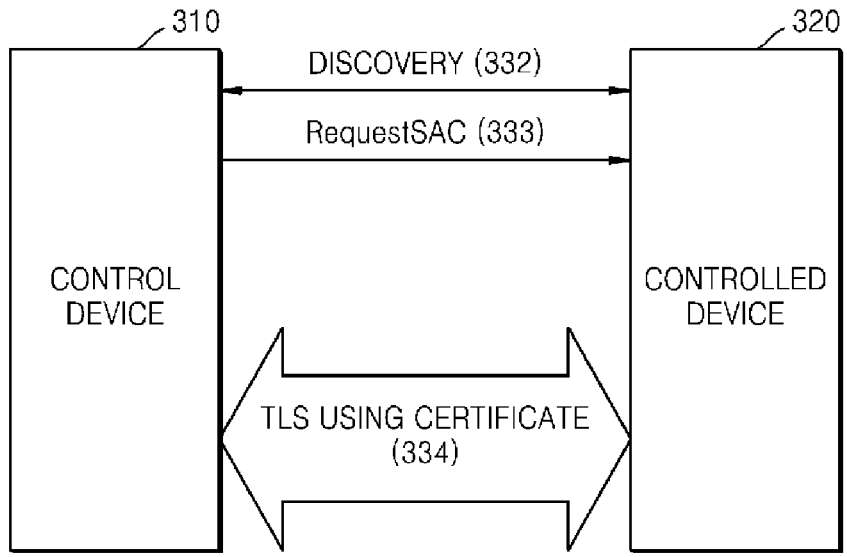
FIG. 3 is a diagram illustrating a method of establishing a Secure Authenticated Channel (SAC) between a control device and a controlled device according to an exemplary embodiment of the present invention.

FIG. 3 is a diagram illustrating a method of generating an SAC between a control device 310 and a controlled device 320 according to an exemplary embodiment of the present invention.

In the current exemplary embodiment, it is assumed that the control device 310 and the controlled device 320 are already registered in a security manager (operation 331).

The control device 310 discovers the controlled device 320 (operation 332). The control device 310 calls a RequestSAC( ) interface (operation 333), thereby starting TLS according to a certificate (operation 334). In order to verify validity of the certificate, a validity period of the certificate may be checked, whether the certificate is registered in a CRL may be checked, or the validity of the certificate may be provided from an Online Certificate Status Protocol (OCSP) service of a security manager.

Figure 4:
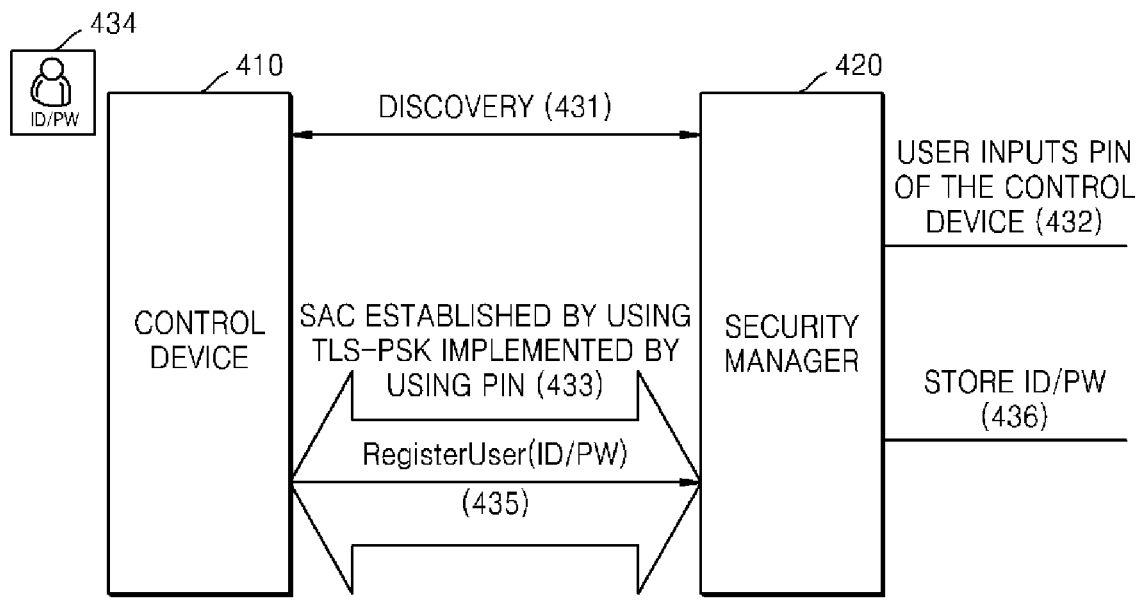
FIG. 4 is a diagram illustrating a method of registering a new user to a security manager via a control device according to an exemplary embodiment of the present invention.

FIG. 4 is a diagram illustrating a method of registering a new user to a security manager 420 via a control device 410 according to an exemplary embodiment of the present invention.

The control device 410 discovers the security manager 420 (operation 431). PIN information of the control device 410 is externally input to the security manager 420 (operation 432). The control device 410 and the security manager 420 establish an SAC by using a TLS-PSK protocol implemented by using a PIN shared between the control device 410 and the security manager 420 (operation 433).

The control device 410 registers a user account to the security manager 420 via a RegisterUser interface of the security manager 420 (operation 435). At this time, user account information may be stored in the control device 410 for a use at a later time. Information requiring security, such as a password of the user account is securely transmitted via the SAC (operation 435). In the case where the SAC is not established, the RegisterUser interface may not be called. The security manager 420 stores the user account information and password information (operation 436).

Meanwhile, in the case where a specific user account and password information are changed or deleted, the specific user account and the password information have to be changed in or deleted from a security manager and devices which store the specific user account and the password information.

A user inputs an identifier of a user account to be changed or deleted via a separate UI of the control device 410 or a separate UI of the security manager 420. The security manager 420 changes or deletes information about the input user account, and distributes the changed or deleted information to devices registered in a home network. At this time, the security manager 420 generates an MAC value by using an SSK, and transmits the MAC value along with the changed or deleted information via broadcast/multicast transmission. By doing so, integrity of the changed or deleted information may be ensured.

Figure 5:
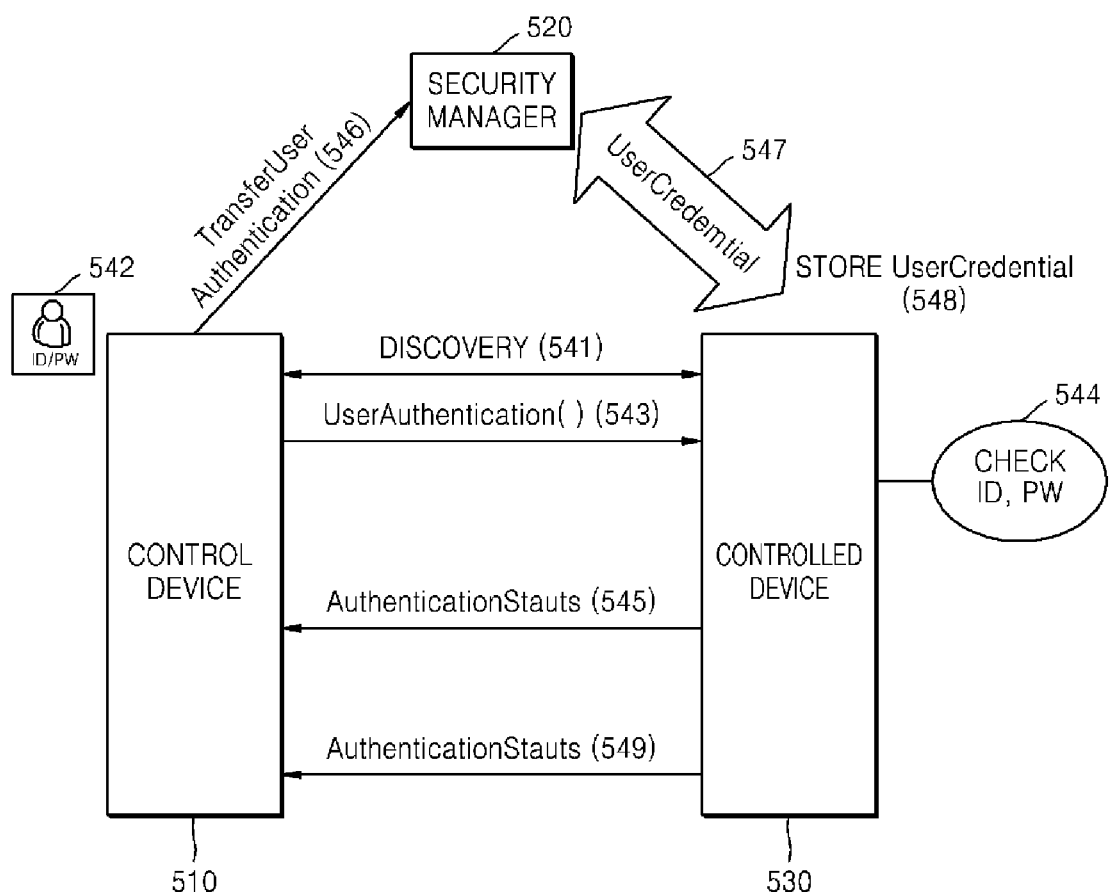
FIG. 5 is a diagram illustrating a method of authenticating a user by using a security manager, wherein the method is performed by a controlled device, according to an exemplary embodiment of the present invention.

FIG. 5 is a diagram illustrating a method of authenticating a user by using a security manager 520, wherein the method is performed by a controlled device 530, according to an exemplary embodiment of the present invention.

The user calls an arbitrary interface of the controlled device 530 by using a control device 510. In the case where the arbitrary interface requires user authentication, the control device 510 requests account information to the user via a UT (operation 542). The control device 510 receives ID/password information from the user via the corresponding UI.

The control device 510 calls an UserAuthentication( ) interface, thereby securely transferring the received ID/password information to the controlled device 530 via a TLS session (operation 543). With respect to the user authentication, if the controlled device 530 has user authentication information stored therein, the controlled device 530 directly performs an authentication process. If the controlled device 530 is not enabled to directly perform the authentication process, the controlled device 530 notices an error via eventing. That is, in the case where the user authentication is not performed due to the controlled device 530 not having user authentication information stored therein (operation 544), the controlled device 530 notices non-performance of the user authentication via eventing of AuthenticationStatus( ) (operation 545), and then the control device 510 calls a TransferUserAuthentiation( ) interface (operation 546) so as to request the security manager 520 to transfer the user authentication information to the corresponding controlled device 530. The controlled device 530 receives the user authentication information from the security manager 520 (operation 547), and then performs the user authentication. If required, the controlled device 530 may store the user authentication information (operation 548) and may use it again at a later time when the user authentication is required. An authentication result may be transmitted to the control device 510 via the AuthenticationStatus( ) of the controlled device 530 (operation 549).

Figure 6:
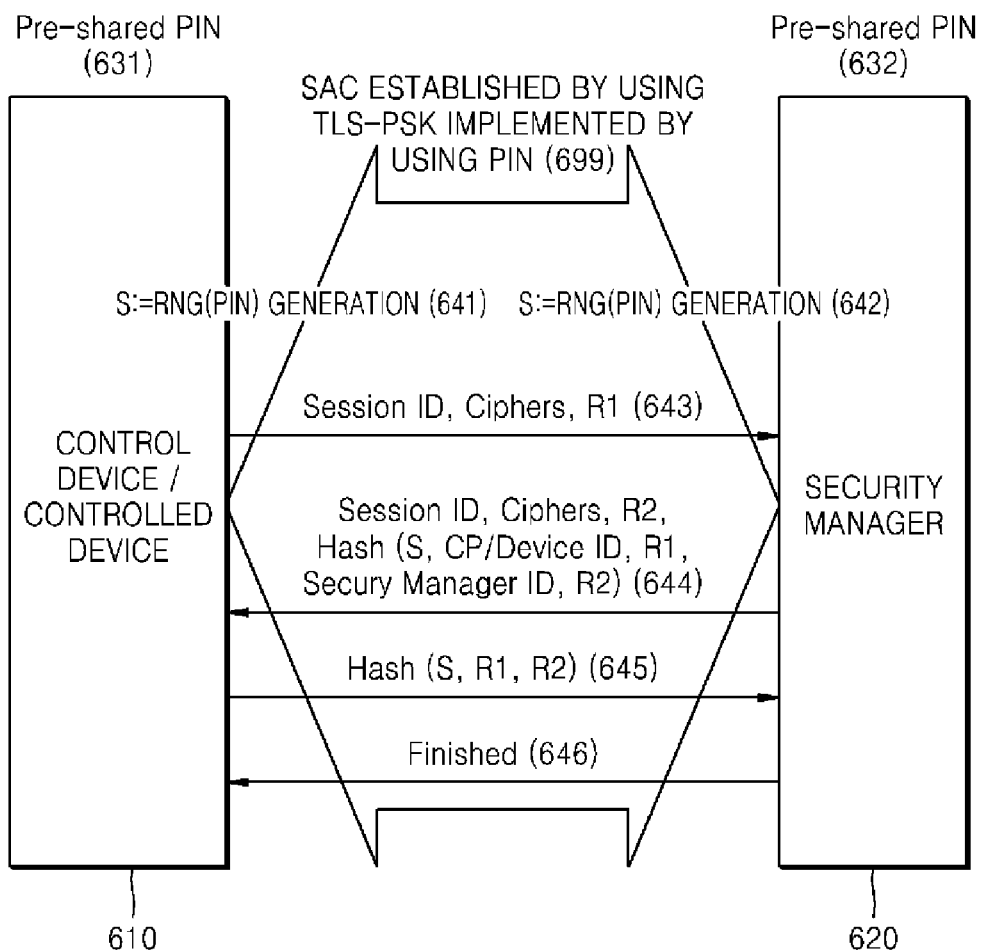
FIG. 6 is a diagram illustrating a method of implementing Transport Layer Security Pre-Shared Key ciphersuites (TLS-PSK) by using a pre-shared Product Identification Number (PIN) value according to an exemplary embodiment of the present invention.

FIG. 6 is a diagram illustrating a method of implementing TLS-PSK by using a pre-shared PIN value according to an exemplary embodiment of the present invention.

The TLS-PSK may be implemented according to RFC 4279. However, most devices implementing TLS 1.1 do not support the RFC 4279. Thus, it is necessary to implement the TLS-PSK in the devices not supporting the RFC 4279 so as to minimize a change in a protocol stack of the existing devices using the TLS protocol. In the current exemplary embodiment, the method of implementing the TLS-PSK by using a TLS session resumption protocol will now be described. Such TLS-PSK may be used replacing a method of generating a channel key according to a Diffie-Hellman key exchange likewise in Wi-Fi Protected Setup (WPS). When a server and a client complete an authentication via TLS, a session is ended. After that, when the session resumes, a session resumption protocol is used to omit an authentication process by using a session ID so as not to repeat the performing of public key calculations (e.g., a Rivest-Shamir-Adleman (RSA) algorithm).

A pre-shared PIN is extended by using a random number generator or a hash function so that a Pre-master secret S is determined (operations 641 and 642). Control device/controlled device 610 and a security manager 620 randomly select a session ID. According to other exemplary embodiments, IDs of the control device/controlled device 610 and an ID of the security manager 620 may be used as the session ID. The control device/controlled device 610 transmit the session ID, ciphers, and an arbitrary Nonce R1 to the security manager 620 (operation 643). The ciphers include an identifier indicating that Pre-shared TLS implemented by a Session Resumption Protocol (SRP) is used. If required, the session ID may include the identifier.

The security manager 620 recognizes the use of a Preshared TLS protocol implemented by the SRP via the ciphers, and transmits a session ID, a cipher, an arbitrary Nonce R2, and hash value generated from a Pre-master secret S, control device/controlled device IDs, an arbitrary Nonce R1, a security manager ID, and an arbitrary Nonce R2 to the control device/controlled device 610 (operation 644).

According to the hash values transmitted from the security manager 620, the control device/controlled device 610 confirms that the security manager 620 has the Pre-master secret S. When the confirmation is successfully finished, the control device/controlled device 610 calculates hash value by inputs of a Pre-master secret S, an arbitrary Nonce R1, and an arbitrary Nonce R2, and transmits the calculated hash value to the security manager 620 (operation 645). The security manager 620 transmits a finish message to the control device/controlled device 610, wherein the finish message indicates that the Pre-shared TLS protocol has been successfully completed (operation 646).

According to the current exemplary embodiment, in order to provide a secure communication between each of devices in a home network, a separate apparatus such as a security console based on an UPnP security architecture and a separate protocol such as a WPS protocol are not required, and also an additional out-of-band protocol is not required to be implemented, except for the TLS. That is, it is possible to easily implement communication security by slightly changing the existing TLS that is widely used. Also, the TLS is implemented by using a pre-shared symmetric key instead of using a public key certificate, thus, a complicated calculation necessary for an authentication process using a public key may be avoided.

Figure 7:
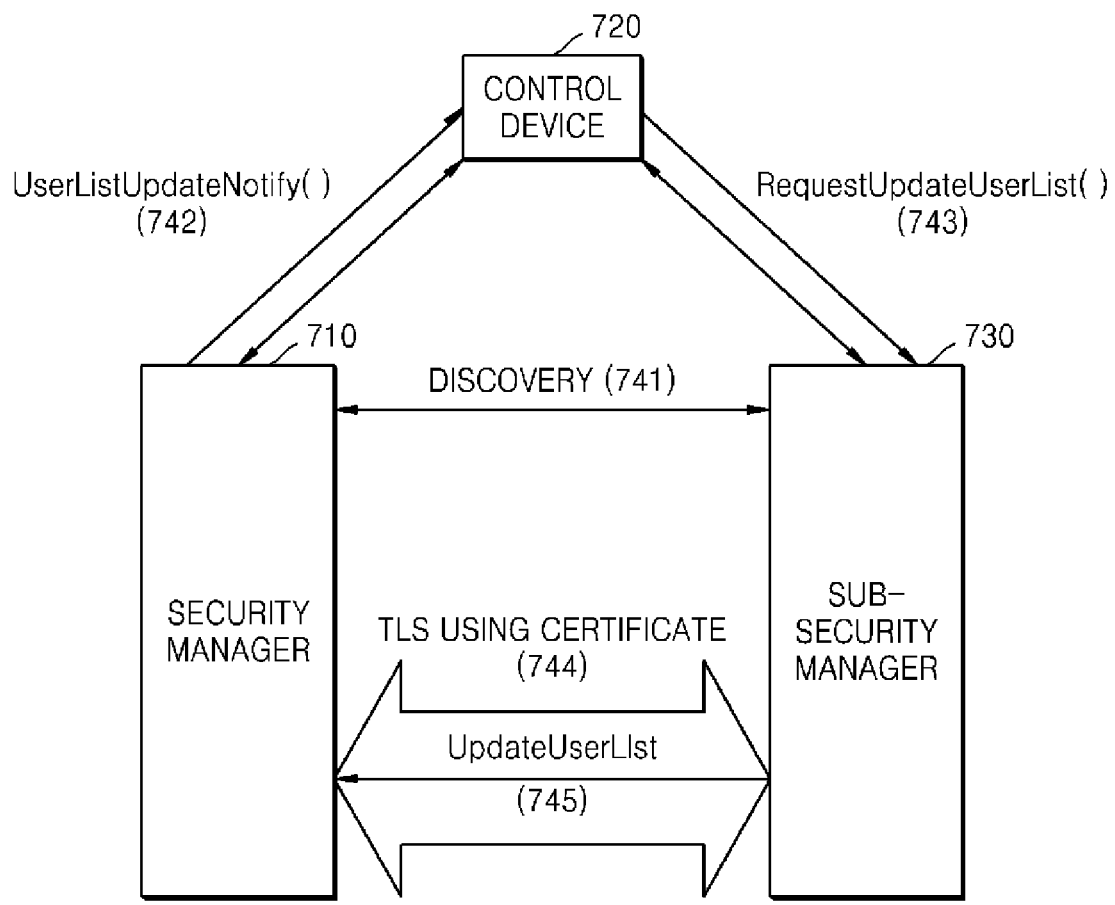
FIG. 7 is a diagram illustrating a method of synchronizing authentication information between a security manager and a sub-security manager according to an exemplary embodiment of the present invention.

FIG. 7 is a diagram illustrating a method of synchronizing authentication information between a security manager 710 and a sub-security manager 730 according to an exemplary embodiment of the present invention.

In a home network, a plurality of security managers may hierarchically exist, and each of the security managers manages authentication information about control devices and controlled devices managed by each of the security managers. When user authentication information is updated in a security manager existing in an upper layer, it is necessary to inform this update to a security manager existing in a lower layer of the upper layer so as to synchronize authentication information between the security managers.

A control device 720 discovers the security manager 710 and the sub-security manager 730 (operation 741). In the case where a certificate, an SSK, or user authentication information is newly added, changed or deleted, the security manager 710 transmits a UserListUpdateNotify( ) message to the control device 720 via broadcast or multicast transmission (operation 742). The control device 720 receives this message, and then transmits a RequestUpdateUserList( ) message to the sub-security manager 730 or a device which needs an update (operation 743). If a plurality of control devices receive this message, the control device 720 transmits the RequestUpdateUserList( ) message after a predetermined lapse of time. If another control device transmits the RequestUpdateUserList( ) message first, the control device 720 cancels message transmission.

One of the sub-security manager 730 or the control device 720, which needs the update, sets a TLS connection based on a certificate with a corresponding security manager (operation 744), and starts the update by using an UpdateUserList( ) (operation 745). In order to verify validity of the certificate, a validity period of the certificate may be checked, whether the certificate is registered in a CRL may be checked, or the validity of the certificate may be provided from an OCSP service of a security manager.

Figure 8:
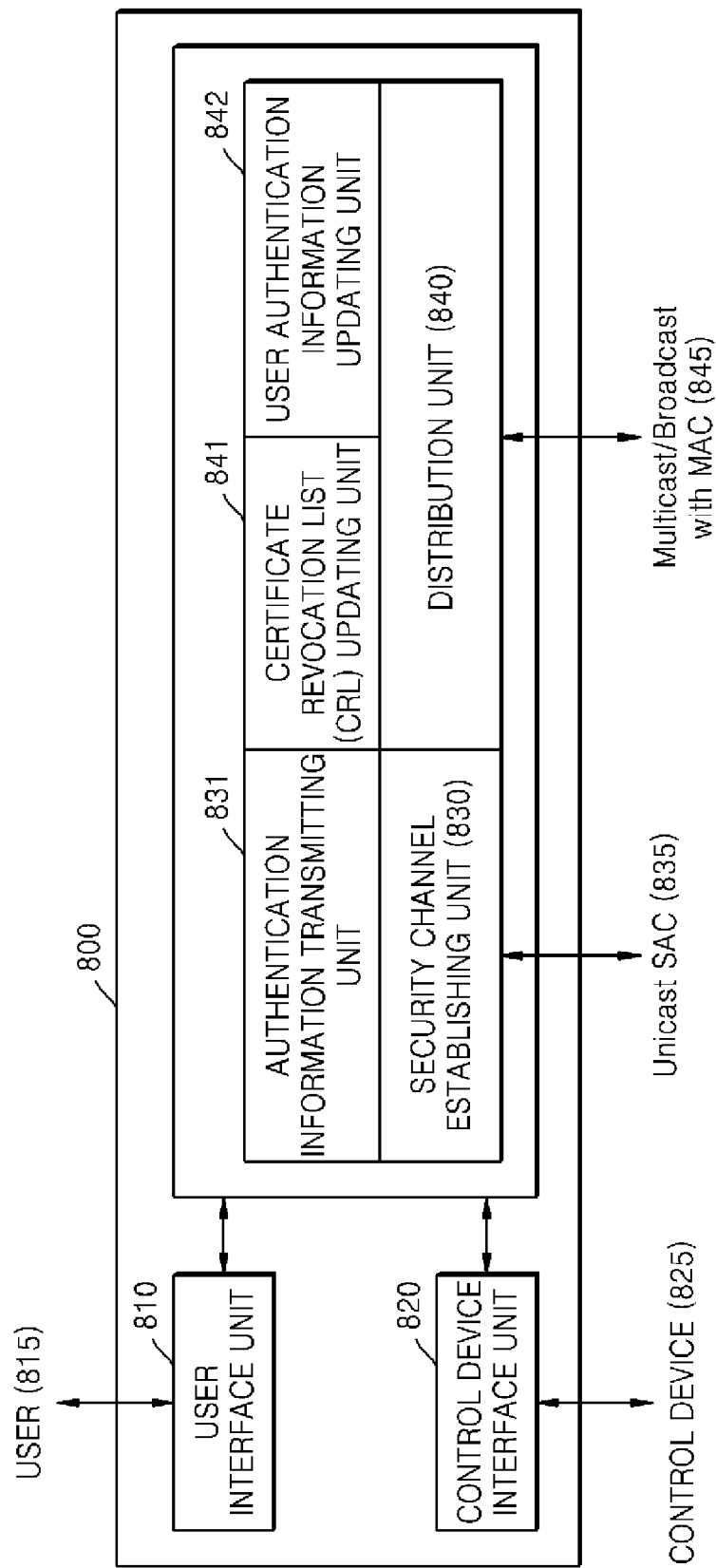
FIG. 8 is a block diagram of a structure of a security manager apparatus, according to an exemplary embodiment of the present invention.

FIG. 8 is a block diagram of a structure of a security manager apparatus 800, according to an exemplary embodiment of the present invention.

A user interface unit 810 externally receives PIN information of a device (e.g., from a user) so as to establish an SAC (refer to operation 122 of FIG. 1 and operation 232 of FIG. 2). In the case where a previously generated certificate is revoked, an identifier of the certificate to be revoked is externally input, or in the case where previously received user authentication information is changed or deleted, the user authentication information to be changed or deleted is externally input.

A control device interface unit 820 receives a control command from a control device 825. To be more specific, the control device interface unit 820 receives a control command allowing a certificate and an SSK, which are generated with respect to the control device 825 or a controlled device, to be transmitted to the control device 825 or the controlled device (refer to operation 125 of FIG. 1 and operation 235 of FIG. 2). Also, the control device interface unit 820 receives a control command allowing user authentication information to be transmitted to the controlled device (refer to operation 546 of FIG. 5), and receives user authentication information from the control device 825 via an SAC (refer to operation 435 of FIG. 4).

As illustrated in FIG. 6, a security channel establishing unit 830 sets an SAC by implementing TLS-PSK by using a pre-shared PIN (refer to operation 123 of FIG. 1, operation 233 of FIG. 2, operation 433 of FIG. 4, operation 547 of FIG. 5, and operation 699 of FIG. 6).

An authentication information transmitting unit 831 transmits authentication information to the control device 825 or the controlled device via the SAC (refer to operation 126 of FIG. 1, and operation 236 of FIG. 2). Also, by way of a request from the control device 825, the authentication information transmitting unit 831 transmits stored user authentication information to the controlled device via the SAC (refer to operation 547 of FIG. 5).

A distribution unit 840 generates an MAC value by using the SSK, and then transmits the MAC value along with a message via broadcast/multicast transmission, thereby ensuring integrity of the message.

A CRL updating unit 841 externally receives an identifier, or adds a certificate to a CRL, wherein the certificate is about a device which has not been discovered during a predetermined period of time. An updated CRL is distributed to registered devices via the distribution unit 840.

A user authentication information updating unit 842 changes or deletes user authentication information externally received. Updated user authentication information is distributed to the registered devices via the distribution unit 840.

The invention can also be embodied as computer readable codes on a computer readable recording medium. The computer readable recording medium is any data storage device that can store data, which can be thereafter read by a computer system. Examples of the computer readable recording medium (including all devices having information process functions) include read-only memory (ROM), random-access memory (RAM), CD-ROMs, magnetic tapes, floppy disks, and optical data storage devices.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of managing authentication information in a home network, the method comprising:
   receiving Product Identification Number (PIN) information that is externally input and is an identifier allocated to a control device or a controlled device at a time of manufacture; and
   transmitting authentication information to the control device or the controlled device via a Secure Authenticated Channel (SAC) generated by using a Transport Layer Security Pre-Shared Key ciphersuites (TLS-PSK) protocol implemented by using the PIN information, wherein the authentication information is necessary for a user to control the controlled device via the control device; and
   establishing the SAC by using a TLS-PSK protocol implemented by using a Transport Layer Security (TLS) session resumption protocol which uses a randomly generated value as a session identification (ID).

2. The method of claim 1, wherein the establishing the SAC comprises:
   calculating a hash value by using a pre-master secret generated from the PIN information; and
   transmitting the hash value to the control device or the controlled device, whereby the control device or the controlled device authenticates a security manager.

3. The method of claim 1, wherein the authentication information comprises a certificate about the control device or the controlled device, a security key shared in the home network, and user authentication information about a user.

4. The method of claim 3, further comprising:
   generating the certificate about the control device or the controlled device; and
   receiving the user authentication information from the control device via the SAC.

5. The method of claim 3, further comprising:
   adding the certificate to a Certificate Revocation List (CRL), wherein the certificate is about a device corresponding to an identifier that is externally input or a device that is not discovered during a predetermined period of time; and
   distributing the CRL to a plurality of registered control devices and controlled devices.

6. The method of claim 3, further comprising:
   changing or deleting user authentication information that is externally input; and
   distributing the changed or deleted user authentication information to the plurality of registered control devices and controlled devices.

7. The method of claim 5, wherein the distributing the CRL comprises generating a Message Authentication Code (MAC) value by using the security key shared in the home network, and transmitting the MAC value along with a message via broadcast or multicast transmission.

8. The method of claim 6, wherein the distributing the changed or deleted user authentication information comprises generating a Message Authentication Code (MAC) value by using the security key shared in the home network, and transmitting the MAC value along with a message via broadcast or multicast transmission.

9. The method of claim 1, wherein the method is performed by a security manager, and the security manager is selected from among a plurality of security managers according to a predetermined priority order.

10. The method of claim 1, further comprising:
    requesting update of information to a sub-security manager, which manages authentication information in a lower layer of management, via the control device if authentication information is newly added, changed or deleted;
    establishing the SAC with the sub-security manager; and
    transmitting the newly added, changed or deleted authentication information to the sub-security manager.

11. An apparatus for managing authentication information in a home network, the device comprising:
- a user interface unit which receives Product Identification Number (PIN) information that is externally input and is an identifier allocated to a control device or a controlled device at a time of manufacture;
- a authentication information transmitting unit which transmits authentication information to the control device or the controlled device via a Secure Authenticated Channel (SAC) generated by using a Transport Layer Security Pre-Shared Key ciphersuites (TLS-PSK) protocol implemented by using the PIN information, wherein the authentication information is necessary for a user to control the controlled device via the control device; and
- a security channel establishing unit establishing the SAC by using a TLS-PSK protocol implemented by using a Transport Layer Security (TLS) session resumption protocol which uses an randomly generated value as a session identification (ID).

12. The apparatus of claim 11, wherein the security channel establishing unit comprises:
- a hash value calculating unit calculating a hash value by using a Pre-master secret generated from the PIN information; and
- a hash value transmitting unit transmitting the hash value to the control device or the controlled device, whereby the control device or the controlled device authenticates a security manager.

13. The apparatus of claim 11, wherein the authentication information comprises a certificate about the control device or the controlled device, a security key shared in the home network, and user authentication information about a user.

14. The apparatus of claim 13, further comprising:
- a certificate generation unit which generates the certificate about the control device or the controlled device; and
- a control device interface unit which receives the user authentication information from the control device via the SAC.

15. The apparatus of claim 13, further comprising:
- a Certificate Revocation List (CRL) updating unit which adds the certificate to a CRL, wherein the certificate is about a device corresponding to an identifier that is externally input or a device that is not discovered during a predetermined period of time; and
- a CRL distribution unit which distributes the CRL to a plurality of registered control devices and controlled devices.

16. The apparatus of claim 13, further comprising:
- a user authentication information updating unit which changes or deletes user authentication information that is externally input; and
- a user authentication information distribution unit which distributes the changed or deleted user authentication information to the plurality of registered control devices and controlled devices.

17. The apparatus of claim 15, wherein the CRL distribution unit generates a Message Authentication Code (MAC) value by using the security key shared in the home network, and transmits the MAC value along with a message via broadcast or multicast transmission.

18. The apparatus of claim 16, wherein the user authentication information distribution unit generates a Message Authentication Code (MAC) value by using the security key shared in the home network, and transmits the MAC value along with a message via broadcast or multicast transmission.

19. The apparatus of claim 11, wherein the device is implemented in a security manager, and the security manager is selected from among a plurality of security managers according to a predetermined priority order.

20. The apparatus of claim 11, further comprising:
- an update request unit which requests update of information to a sub-security manager, which manages authentication information in a lower layer of management, via a control device if authentication information is newly added, changed or deleted;
- a channel establishing unit which establishes the SAC with the sub-security manager; and
- a synchronization unit which transmits the newly added, changed or deleted authentication information to the sub-security manager.

21. A non-transitory recording medium having recorded thereon a computer program for executing a method of managing authentication information in a home network, the method comprising:
- receiving Product Identification Number (PIN) information that is externally input and is an identifier allocated to a control device or a controlled device at a time of manufacture;
- transmitting authentication information to the control device or the controlled device via a Secure Authenticated Channel (SAC) generated by using a Transport Layer Security Pre-Shared Key ciphersuites (TLS-PSK) protocol implemented by using the PIN information, wherein the authentication information is necessary for a user to control the controlled device via the control device; and
- establishing the SAC by using a TLS-PSK protocol implemented by using a Transport Layer Security (TLS) session resumption protocol which uses a randomly generated value as a session identification (ID).

* * * * *